United States Patent
Sunay et al.

(10) Patent No.: US 9,949,188 B2
(45) Date of Patent: Apr. 17, 2018

(54) SYSTEM AND METHOD FOR COMMUNICATION BETWEEN PROGRAMMABLE BASE STATIONS AND SOFTWARE-DEFINED RADIO ACCESS NETWORK CONTROLLERS

(71) Applicant: NETSIA, INC., Sunnyvale, CA (US)

(72) Inventors: Mehmet Oguz Sunay, San Francisco, CA (US); Ahmet Murat Parlakisik, Milpitas, CA (US); Jung Shik Choi, Sunnyvale, CA (US)

(73) Assignee: NETSIA, INC., Sunnyvale, CA (US)

( * ) Notice: Subject to any disclaimer, the term of this patent is extended or adjusted under 35 U.S.C. 154(b) by 0 days.

(21) Appl. No.: 15/592,159

(22) Filed: May 10, 2017

(65) Prior Publication Data

US 2017/0332295 A1    Nov. 16, 2017

Related U.S. Application Data

(60) Provisional application No. 62/334,364, filed on May 10, 2016.

(51) Int. Cl.
| | |
|---|---|
| *H04W 36/08* | (2009.01) |
| *H04W 12/06* | (2009.01) |
| *H04W 24/10* | (2009.01) |
| *H04W 8/22* | (2009.01) |
| *H04W 72/04* | (2009.01) |
| *H04W 92/12* | (2009.01) |

(52) U.S. Cl.
CPC ............ *H04W 36/08* (2013.01); *H04W 8/22* (2013.01); *H04W 12/06* (2013.01); *H04W 24/10* (2013.01); *H04W 72/048* (2013.01); *H04W 92/12* (2013.01)

(58) Field of Classification Search
CPC ....... H04W 36/08; H04W 8/22; H04W 12/06; H04W 24/10; H04W 72/048; H04W 92/12
See application file for complete search history.

(56) References Cited

U.S. PATENT DOCUMENTS

| | | | |
|---|---|---|---|
| 5,533,028 | A | 7/1996 | Hita de la Torre et al. |
| 7,983,712 | B2 | 7/2011 | Mayer et al. |
| 8,027,676 | B2 | 9/2011 | Moon et al. |
| 8,351,948 | B2 | 1/2013 | Kokku et al. |
| 8,660,071 | B2 | 2/2014 | Borran et al. |
| 8,681,729 | B2 | 3/2014 | Wengerter et al. |
| 8,700,047 | B2 | 4/2014 | Kokku et al. |
| 8,831,522 | B2 | 9/2014 | Bhattad et al. |
| 8,873,482 | B2 | 10/2014 | Kokku et al. |
| 8,874,125 | B2 | 10/2014 | Mahindra et al. |
| 8,923,239 | B2 | 12/2014 | Kokku et al. |
| 2003/0063582 | A1 | 4/2003 | Mizell et al. |
| 2012/0002620 | A1 | 1/2012 | Kokku et al. |
| 2014/0045513 | A1 | 2/2014 | Lim |
| 2014/0368306 | A1 | 12/2014 | Kang |

*Primary Examiner* — Dinh P Nguyen
(74) *Attorney, Agent, or Firm* — IP Authority, LLC; Ramraj Soundararajan (57) ABSTRACT

Base stations as well as Radio Access Network (RAN) controllers have embedded communication agents that are responsible from control messaging between these entities that enable creation and management of RAN Slices. At a given time, it is possible that multiple active RAN slices co-exist on the same base station, where each RAN slice may run its own scheduler, its own admission control and have its own handoff management parameter values.

5 Claims, 6 Drawing Sheets

SYSTEM AND METHOD FOR COMMUNICATION BETWEEN PROGRAMMABLE BASE STATIONS AND SOFTWARE-DEFINED RADIO ACCESS NETWORK CONTROLLERS

RELATED APPLICATIONS

This application claims the benefit of provisional application 62/334,364 filed May 10, 2016.

BACKGROUND OF THE INVENTION

Field of Invention

The present application pertains to the information exchange between the base stations and the radio access network controllers of software-defined wireless broadband communication systems where network slices may be created, altered or revoked programmatically.

Discussion of Related Art

This invention is concerned with the communication method between a control agent and programmable base stations in the radio access network to enable virtualization in the network.

In both second and third generation cellular networks, controllers control base stations. In second generation networks, this controller was called the Base Station Controller (BSC) and was responsible for controlling the channel (time-slot) allocation implemented by the base stations, handovers across the base stations and location tracking of the mobiles in the network. In third generation networks, the controller was renamed as the Radio Network Controller (RNC) and similar to the BSC, it was responsible for radio resource control, channel allocation, power control, handover control, ciphering as well as segmentation and reassembly of the data traffic. Both controllers also act as mobility anchors for the flowing traffic. Besides the standards specifications, there have been a fair number of prior art in architecting systems involving BSCs and RNCs.

U.S. Pat. No. 5,533,028 B2 discusses a BSC in which the guard fields in the TDM-based data flows between itself and the base stations, it controls is reduced to make room for control and signaling information. U.S. Patent Publication 2003/0063582 A1 discusses a BSC that also serves as a gateway to an external packet data network and as such directly transfers flows between this network and the base stations.

U.S. Pat. No. 7,983,712 B2 discusses a centralized RNC architecture to simplify the switching of user data traffic throughout the radio access network. U.S. Patent Publication 2014/0368306 A1 discusses a system where the data communications between the RNC and the base stations use a fixed-length data size or a variable-length data size. The RNC transmits information indicating which packet size option to be used.

U.S. Pat. No. 8,027,676 B2 presents a RNC system that includes a connection setup request transmitter configured to transmit a request to set up the connection to the mobile station located in the specific cell; and a judger configured to judge whether or not to acquire information from the mobile station located in the specific cell. In the system of the invention, the connection setup request transmitter is configured to transmit the connection setup request to the mobile station only when the judger deems necessary to acquire information from the mobile station.

Starting with the fourth-generation cellular network, also known as LTE, the radio network/base station controller has disappeared in the cellular network architecture. Instead, the functionalities of this controller have been moved to the base stations. In other words, the radio resource control, channel allocation, power control, handover control, ciphering and segmentation and reassembly of user data traffic functions are all conducted in a distributed fashion within each base station in LTE.

This invention is intended for fourth generation cellular systems and beyond. In the system of the present invention, a RAN controller is introduced into the network. However, the function of this controller is very different than a BSC or RNC. First, in the network of the invention, the control functionalities of radio resource control, channel allocation, power control, handover control, ciphering and segmentation and reassembly of user data traffic functions still reside on the individual base stations. However, the system of the invention allows for the establishment, modification, and removal of virtual radio access networks, described as RAN slices, programmatically. It is this functionality that the RAN controller of the present invention oversees. The concept of virtualization may be described as a methodology that enables an underlying resource to be shared across multiple consumers, while providing each consumer with the illusion that it owns the entire resource. In wireless systems, specific applications and design goals lead to different virtualization methodologies. We can broadly categorize the concept of wireless virtualization into the following distinct perspectives: wireless network-level virtualization, device-level virtualization, flow-level virtualization, protocol-level virtualization, wireless resources-level virtualization. Most of the previous work on wireless virtualization focuses on a subset of these perspectives.

Wireless Network-Level Virtualization focuses on enabling multiple, isolated logical wireless networks, potentially each operated by a different mobile virtual network operator (MVNO), over a shared physical wireless network infrastructure. There may be different levels of network virtualization for a MVNO. The MVNO may have no infrastructure of its own and may be leasing all aspects of the cellular network from a mobile network operator (MNO) who owns the network infrastructure. Alternatively, the MVNO may own a portion of the network infrastructure, such as network services or even the entire core network, and lease only the access network from a MNO. 3GPP has defined an interoperability requirements document for cellular network-level virtualization for MVNOs. Wireless network-level virtualization may also be employed by a single network operator in order to define various logical networks within its coverage for various purposes.

Device-Level Virtualization focuses on decoupling a portion of the base station equipment from the rest so that the decoupled portion may be realized on commodity hardware in the cloud as a common resource to be shared across a group of base stations. This architecture is commonly referred to as Cloud-RAN in the literature. A typical base station is a distributed architecture composed of the baseband unit (BBU) and remote radio unit (RRU) parts. The BBU is placed in the equipment room and connected to the RRH via optical fiber. The Cloud-RAN architecture typically virtualizes the baseband unit (BBU) functionality in full and realizes them in a centralized pool in the cloud on high-performance programmable processors and real-time virtualization technology. The typical base stations are reduced to simple RRU units with antennas in this case. The U.S. Patent Publication 2014/027792 A1 discusses a Cloud-RAN system and presents a resource scheduling method for the RRU to access the BBU realizations in the cloud.

Flow-Level Virtualization focuses on providing isolation, scheduling, management and service differentiation for both downlink and uplink traffic flows from other flows in a manner similar to how OpenFlow enables flow differentiation for software-defined networks (SDNs). One way of realizing flow-level virtualization is using an overlay filter and software switch module. This method, as described in U.S. Patent Publication 2012/0002620 A1, does not require any modifications to the underlying base station. The patent application defines a group of select flows as a slice, and describes a so-called slice scheduler that is realized outside the base stations. The slice scheduler decides which of the flows should enter the base station and ensures that packets of flows from only the desired slice enter the base station at a given time. The base station then processes these flows in a typical manner by using a flow-level scheduler. Alternatively, flow-level virtualization could also be integrated into the base station protocol stack so that the slice scheduler is implemented within the stack, just before the flow scheduler. The U.S. Pat. No. 8,873,482 B2 discusses a flow-level virtualization for a base station where the uplink and downlink flows are grouped into base station slices. Each slice requests to reserve a portion of the base station resources and is given a normalized weight that reflects this request. The slice scheduler, which is implemented inside the base station, selects which slice to service at a given time, based on the slice weights. For that time, that slice completely controls the base station. It then utilizes a flow scheduler to schedule which flows to service from that slice. The invention disclosed in the patent allows for each slice to have its own flow scheduling function.

Protocol-Level Virtualization focuses on the isolation, customization, and management of multiple protocol instances on one base station equipment. The resource to be virtualized depends on which aspect of the protocol stack is considered. For a MAC-layer virtualization, for example, the scheduling operation may be virtualized. In this case, the base station protocol stack is implemented in such a way that multiple instances of the scheduler may run on it. U.S. Pat. Nos. 8,700,047 B2 and 8,351,948 B2 define flow management functions that contain the operations of virtual time tagging of packets, scheduler operations and model specification operations that specify the relative weights of the flows, and discuss a method to dynamically change the flow management function, and thus the scheduler operation in a base station. Similarly, the U.S. Pat. No. 8,923,239 B2 discusses a base station that dynamically selects a scheduling operation based on a received model specification. Here, the model specification includes a weight distribution, modulation and coding scheme, packet loss value, and minimum and maximum rates of a flow. For a PHY-layer virtualization, on the other hand, the modulation, coding, and other signal processing modules that are implemented on a hardware DSP may be virtualized by defining a DSP sharing scheme for the multiple PHY instances. It is also possible to define a full protocol stack virtualization so that multiple different protocol stacks may operate on the same base station equipment. This is possible using a programmable software-defined radio (SDR) architecture. The SDR allows for a base station to support multiple radio access technologies using the same hardware components.

Wireless Resources-Level Virtualization focuses on the abstraction and dynamic allocation of the wireless radio resources, which are typically defined as a subset of the space defined by the frequency, time, code, power and antenna dimensions. The specific definition of the wireless resources is standard dependent. For example, in LTE, a wireless resource is commonly referred to as a resource block (RB) defined in the frequency-time space. Wireless resources-level virtualization provides the lowest level of slicing possible. There are multiple possible uses for wireless resources-level virtualization. It may be used in a cellular network to reduce the inter-base station interference. For example, U.S. Pat. Nos. 8,660,071 B2 and 8,831,522 B2 present similar distributed dynamic resource partitioning techniques among neighboring base stations so that the potential interference one base station causes to its neighbors is as small as possible. Similarly, the U.S. Patent Publication 2014/0045513 A1 discusses a scenario where multiple operators share wireless resources and a central management server oversees resource partitioning. The resources are dynamically partitioned amongst the operators in different parts of the network via resource ratio change messages sent by the management server. The wireless resources-level virtualization may also be used to satisfy quality-of-service (QoS) requirements of different flows. For example, LTE uses semi-persistent scheduling for voice flows where a specific RB is reserved for the voice call for the entirety of the call. U.S. Pat. No. 8,681,729 B2 discusses reserving specific RBs to multiple flows for a certain duration of time, described by a message. In the case where same RBs are reserved for multiple flows, the system employs a multiplexing technique for the flows to share the common RBs. Alternatively; the wireless resources-level virtualization may be used to allow for multiple instances of the protocol stack to operate on the base station at the same time. If no wireless-level virtualization is present when full protocol stack virtualization is employed, then the architecture remains merely a programmable hardware, where dynamically one can alter the active protocol stack in use as is described in the SDR. However, when both levels of virtualization are present, it is indeed possible for multiple instances of the protocol stack to run in parallel on the base station.

In a system architecture, it is possible to have multiple levels of wireless virtualization at the same time. For example, the U.S. Pat. No. 8,874,125 B2 discusses a wireless system with multiple entities (MNO and MVNOs) that utilizes a virtualization architecture that includes joint wireless network-layer virtualization, flow-level virtualization and partial protocol-layer virtualization. The disclosed system estimates resource requirements of the entities for each base station based on feedback from all base stations, computes the corresponding resource allocations amongst the entities and then enforces flow-level virtualization on each base station using the method of U.S. Pat. No. 8,700, 047 B2.

The invention discussed herein proposes a novel system that allows for communication between a RAN controller and a number of base stations to programmatically radio access network virtualization. The framework of the present invention includes joint wireless network-layer virtualization, flow-level virtualization, protocol-layer virtualization and wireless resources-level virtualization using a profile definition. The profile specifies how the network of base stations are virtualized, how the flows within each of these virtual networks are virtualized, and specifies the protocol virtualization for the individual flows as well as the wireless-resources virtualization for them. The invention discusses a system where controllers communicate with base stations to set-up, modify, terminate as well as control the dynamic RAN slices.

Embodiments of the present invention are an improvement over prior art systems and methods.

SUMMARY OF THE INVENTION

In one embodiment, the present invention provides a method as implemented in a radio access network (RAN) controller during power up of a base station comprising: (a) receiving, from a base station, an Authentication Request message comprising an identity of the base station, the RAN controller; (b) authenticating the received identity of the base station against a database of registered base stations; (c) transmitting a result of the authentication in step (b) as an Acknowledgement message; (d) when the result of the authentication is valid, receiving, from the base station, a Report message comprising a time stamp and a status of the base station; (e) when the received status in step (d) indicates that the base station is active, transmitting, to the base station, a Configuration message comprising profile information for at least one RAN slice called default RAN slice to be activated in the base station, wherein the default RAN slice is programmed to serve all mobile users that are not part of any RAN slices pre-programmed in the base station before power up; and (f) receiving, from the base station, an Acknowledgement message upon successful programming of the default RAN slice.

In another embodiment, the present invention provides a method as implemented in a radio access network (RAN) controller comprising: (a) receiving a time-stamped Event Report message from a base station upon attachment of a mobile station to that base station, the Event Report comprising an identity of the mobile station and a status of the base station; (b) in response to Event Report received in step (a), transmitting a Configuration Update message including an identification of a RAN slice for use with the mobile station based on one of the following: (1) identifying the mobile station is readily associated with a pre-programmed active RAN running in the base station and identifying the pre-programmed active RAN as the identified RAN slice in the Configuration Update message; (2) identifying the mobile station is readily associated with a pre-programmed default RAN profile and identifying a default RAN slice running in the base station corresponding to the default RAN profile as the identified RAN slice in the Configuration Update message; or (3) identifying the mobile station is not associated with any RAN slice, and the Configuration Update message comprising a name of a new RAN slice to be used as the identified RAN slice and any of, or a combination of, the following profile information to program the new RAN slice: downlink scheduler names, uplink scheduler names, admission control rules, handoff management parameters, and percentage of radio resources to be allocated for the new RAN slice; (c) receiving, from the base station, an Acknowledgement message upon successful programming of the RAN slice identified in (b).

In yet another embodiment, the present invention provides a method as implemented in a radio access network (RAN) controller, facilitating a handover of a mobile station based on communicating with a serving base station and a target base station, the method comprising: (a) receiving, from the serving base station, a Handover Flag message comprising an identity associated with the mobile station and an identity of the target base station; (b) determining a new RAN slice in the target base station that serves the mobile station after the handover is completed based on one of the following: (1) the new RAN slice in the target base station picked according to a pre-programmed active RAN slice that the mobile station is associated with; (2) the new RAN slice in the target base station picked according to a pre-programmed default RAN profile that the mobile station is associated with, or (3) the new RAN slice in the target base station is an un-programmed RAN slice, (c) when the mobile station belongs to a pre-programmed RAN slice in the target base station, transmitting, to the target base station, a first configuration update comprising an identification of the pre-programmed RAN slice along with the request to add the mobile station as a slice user, and when the mobile station belongs to a yet un-programmed RAN slice, transmitting, to the target base station, a second configuration update message comprising a request to add the mobile station as a new slice user, a name of the new RAN slice, and any of, or a combination of, the following profile information to program the new RAN slice: downlink scheduler names, uplink scheduler names, admission control rules, handoff management parameters, and percentage of radio resources to be allocated for the new RAN slice, and (d) receiving, from the target base station, an Acknowledgement message upon successful programming of the mobile station to the RAN slice identified in (b).

In another embodiment, a RAN controller is provided that includes a processor and computer storage storing computer readable program code implementing any one of the above-noted methods.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The present invention describes a communication system between the base stations and radio access network (RAN) controllers. This system enables the overall programmability of the software-defined RAN.

In the software-defined RAN of the present invention, the RAN controllers have the capability to control the virtualization of the RAN within their geography based on profiles that may be created, altered or removed dynamically. This enables a RAN Controller to program a specific profile description for a RAN slice. In the system, a profile for a RAN slice consists of the following information:

A list of base stations (BSs) for which the profile is valid;
A list of user equipment (UEs) and/or a list of flows for which the profile is valid;
The time duration for which the profile is valid;
The scheduling operation to be sued for the profile;
The handoff operation to be used for the profile;
The admission control operation to be used for the profile;
The percentage of wireless resources that the profile governs.

In the system of the present invention, the base stations as well as the RAN Controller have embedded Communication Agents that are responsible from control messaging between these entities that enable creation, and management of RAN Slices. At a given time, it is possible that multiple active RAN slices co-exist on the same base station. In this case, each RAN slice may run its own scheduler, its own admission control and have its own handoff management parameter values.

The communication between the RAN Controller and a base station it governs starts when the base station is first added to the cellular network. Upon power-up, the Communication Agent in the base station authenticates itself with the RAN Controller. If authenticated, the RAN Controller admits it to its pool of programmable base stations. Subsequently, the RAN Controller, via its own Communication Agent, sends configuration information to the base station regarding a Default Profile. This profile describes a Default RAN Slice for all mobile users that become attached to this base station and do not belong to any other active RAN Slice.

The communication between the RAN Controller and a base station it governs starts when the base station is first added to the cellular network. Upon power-up, the Communication Agent in the base station authenticates itself with the RAN Controller. If authenticated, the RAN Controller admits it to its pool of programmable base stations. Subsequently, the RAN Controller, via its own Communication Agent, sends configuration information to the base station regarding a Default Profile. This profile describes a Default RAN Slice for all mobile users that become attached to this base station and do not belong to any other active RAN Slice.

It is possible to alter the profile specification of an active slice. The RAN Controller initiates this by sending, via its Communication Agent, a Configuration Update to the base station. This message identifies the slice profile to be modified and the entries that are to be updated. Upon receipt of this message, the base station immediately modifies the slice profile. It is also possible to terminate a slice prematurely. The RAN Controller can also initiate this by sending, via its Communication Agent, a Configuration Update to the base station. This message identifies the slice to be terminated. Upon receipt, the base station immediately terminates this slice. This is conducted by moving the active mobile users that are being serviced within the to-be-terminated slice to the default slice and allocating the wireless resources that have been released by the to-be-terminated slice to the default slice.

When a handover process is initiated by a base station for one of the mobile users, this base station informs the RAN Controller via its Communication Agent about the handover initiation right away. The controller then programs or updates a RAN Slice profile in the target base station so that when the handover process is completed, the mobile user continues getting service in its designated RAN slice.

The preferred embodiment of this invention describes a communication system between multiple programmable base stations and one RAN Controller to allow for dynamic RAN Slicing in the network. Each slice is defined by a distinct profile consisting of the following information:

A list of slice base stations (BSs);
A list of slice user equipment (UEs) and/or a list of slice flows;
The time duration for which the slice is valid;
The scheduling operation to be used for the slice;
The handover operation to be used for the slice;
The admission control operation to be used for the slice;
The percentage of wireless resources that the slice governs.

Figure 1:
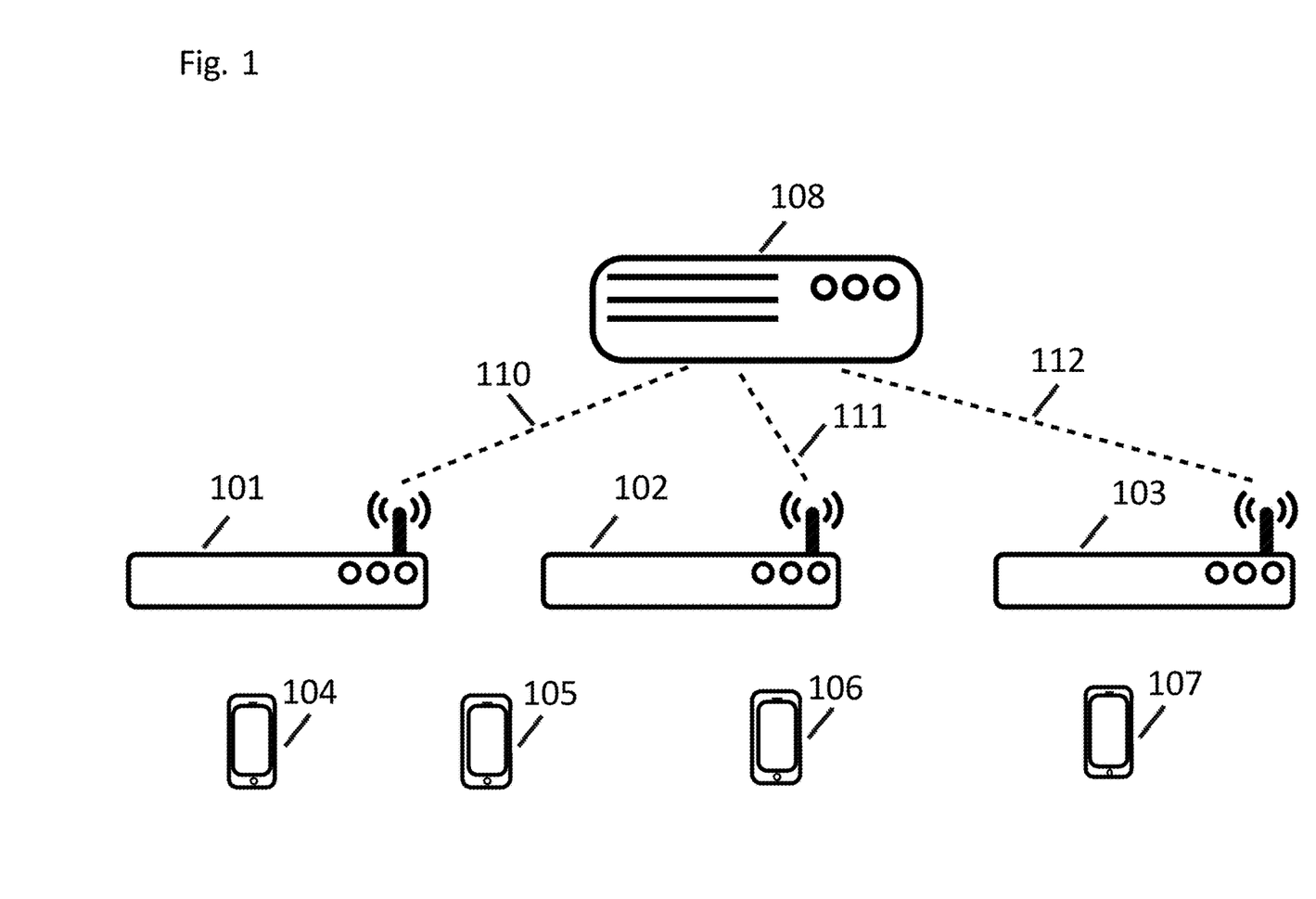
FIG. 1 depicts the radio access network of the present invention.

The communication system of the present invention enables the RAN Controller to dynamically program RAN slices across the network. The system of the embodiment is illustrated in FIG. 1. Here, (101-103) show the programmable base stations. (104-107) show the mobile stations that are attached to the base stations. (108) shows the RAN Controller. The RAN Controller communicates with the programmable base stations using a dedicated control channel as illustrated in (110-112) which may be logical or physical.

Figure 2:
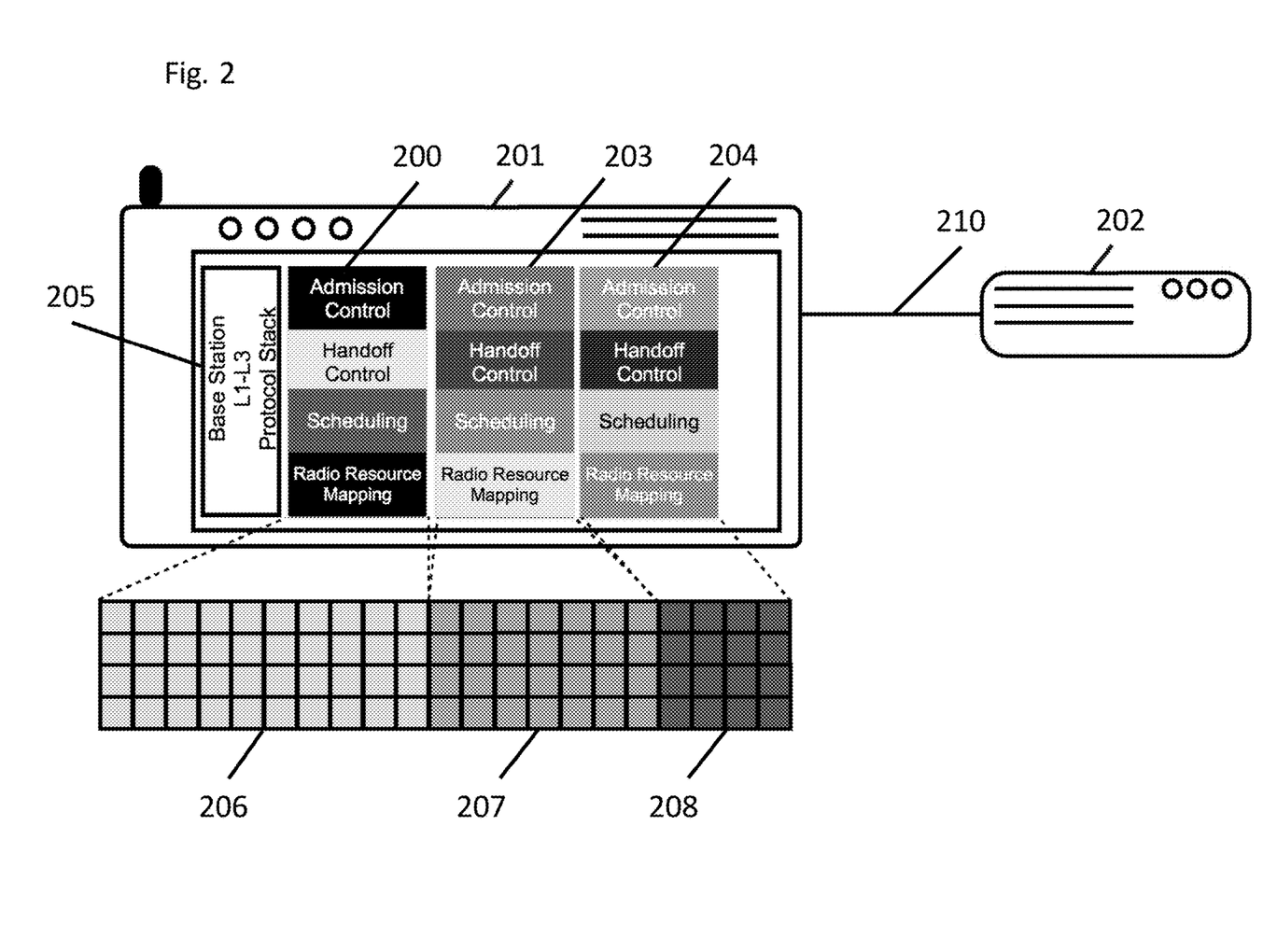
FIG. 2 illustrates how the RAN Controller dynamically creates RAN Slice in a base station.

The communication over the control channel enables the RAN Controller to dynamically program RAN Slices to the programmable base stations where each slice has a corresponding profile description. FIG. 2 shows how the communication creates RAN Slices in one base station. In the figure, (201) shows the programmable base station. (202) is the RAN Controller. Using the control channel (210), the RAN Controller sends new profile configurations to the base station. It may also send configuration modifications if necessary. In the figure, (200, 201, 203 and 204) are three active RAN slices running on the base station. Each slice has its own Admission Control, Handoff Control, and Scheduling operations as well as a Radio Resource Mapper that maps scheduled head-of-line packets to allocated resource blocks for each slice. Also associated with each slice profile is the percentage of radio resources that are reserved for the given slice. This is illustrated in the figure as the radio resource block (206) being allocated to slice (200), (207) being allocated to slice (203) and (208) being allocated to slice (204).

Figure 3:
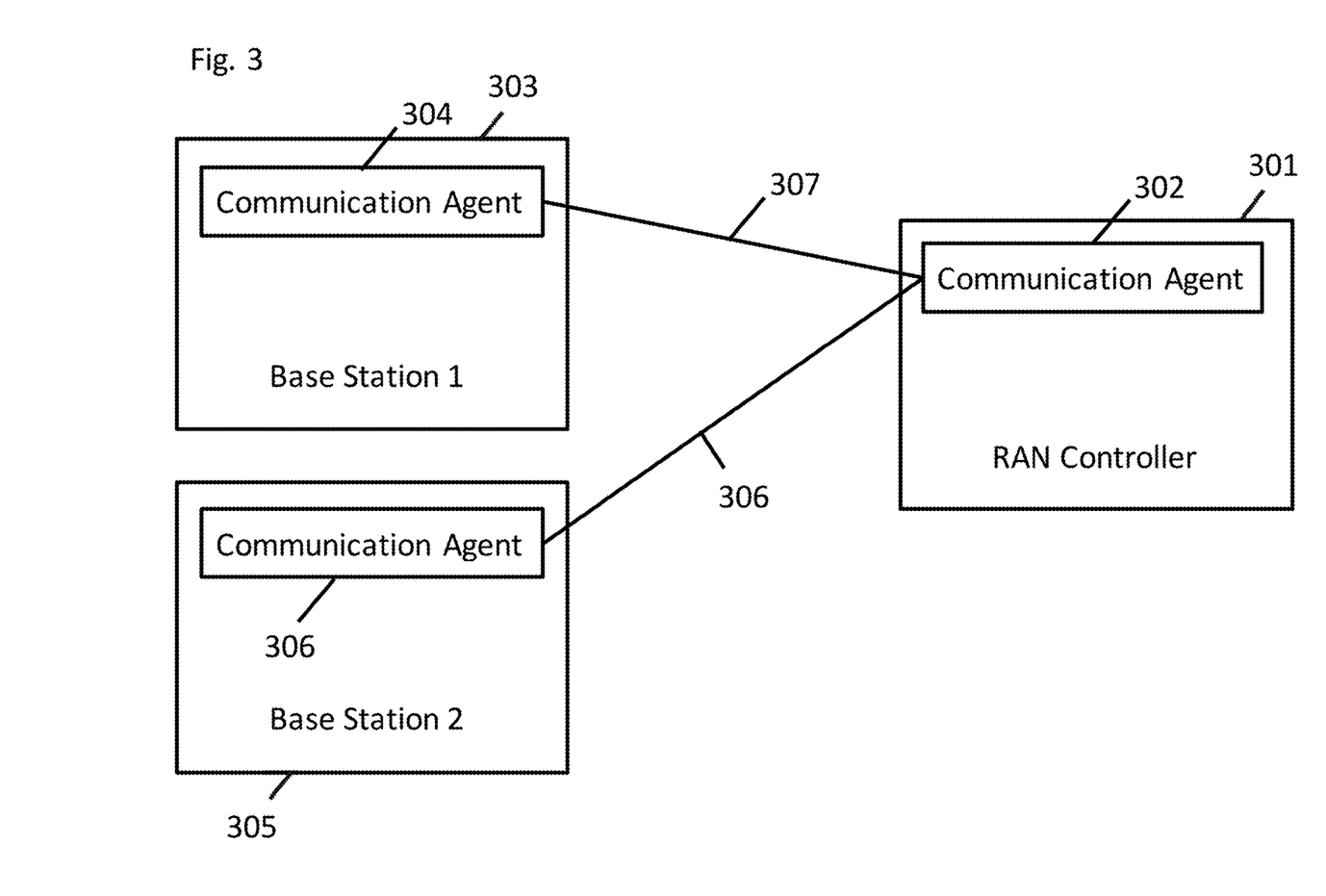
FIG. 3 shows the communication agents in base stations as well as the RAN Controller that enable the transmission of control signaling to allow base station programmability towards dynamic RAN slicing.

FIG. 3 illustrates that both the RAN Controller (301) and the Base Stations (303, 305) use an embedded communication agent, (302) for the RAN Controller and (304, 306) for the base stations, to communicate over the control channel (307, 308).

Figure 4:
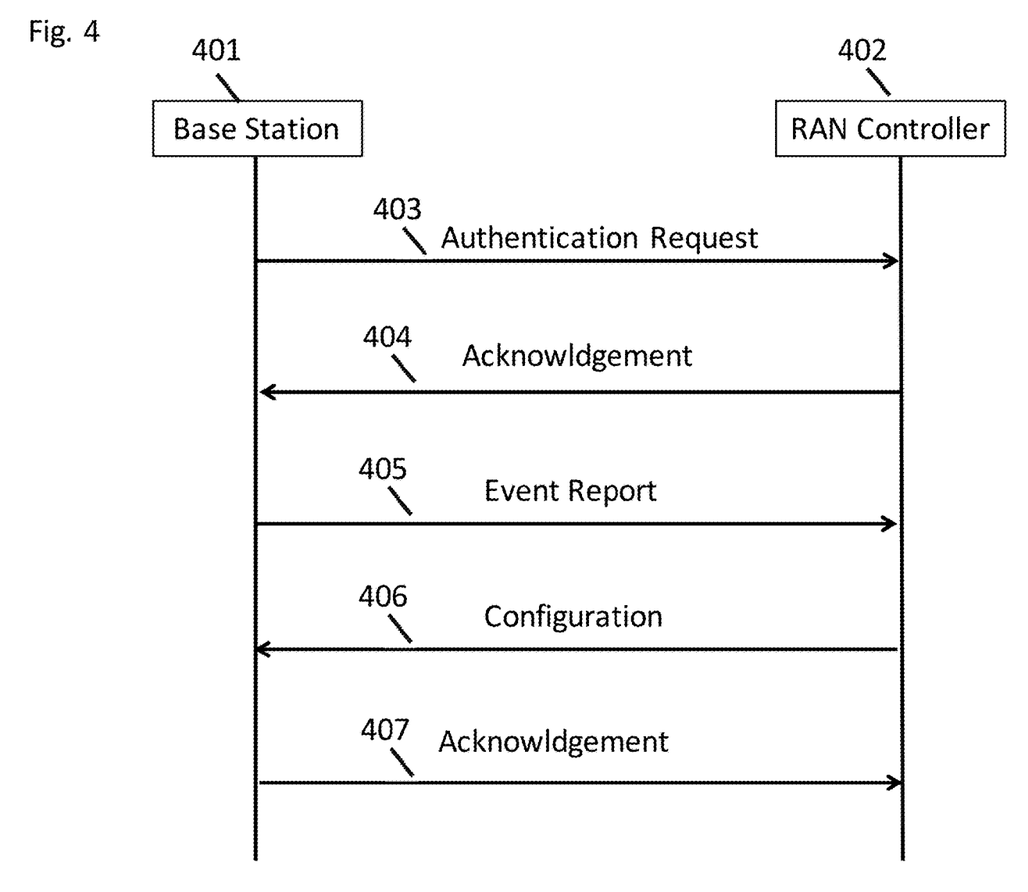
FIG. 4 depicts an example control signaling flow between a base station and RAN Controller when this base station is powered up.

FIG. 4 shows an example control signaling flow between the communication agents of a base station (401) and the RAN Controller (402) upon base station power-up. Upon power-up, the base station sends an Authentication Request message (403), which includes that base station's identity, and optionally base station IP address and its GPS coordinates. Upon receipt, the RAN Controller compares these values with its database of registered base stations. The RAN Controller transmits the authentication result as an Acknowledgement (404). If the authentication is valid, the base station transmits a Report message (405), which includes a time stamp, and its status, which may be Active or No Service. If Active, the RAN Controller then sends a Configuration message (406) to the base station. This message conveys the profile information for the default RAN slice. The default slice is programmed to serve all Mobile Users that do not belong to any other active RAN Slice. Once programming is completed, the Base Station sends an Acknowledgement message (407). While this sequence of signaling is the preferred embodiment for how communication is conducted in the system upon base station power-up, alternative sequences also exist. In another embodiment, messages (403) and (405) may be combined and transmitted together. As a response, messages (404) and (406) are combined and transmitted together. In yet another embodiment, the default RAN slice profile is pre-programmed to each base station. In this case, upon power-up, only authentication takes place.

Figure 5:
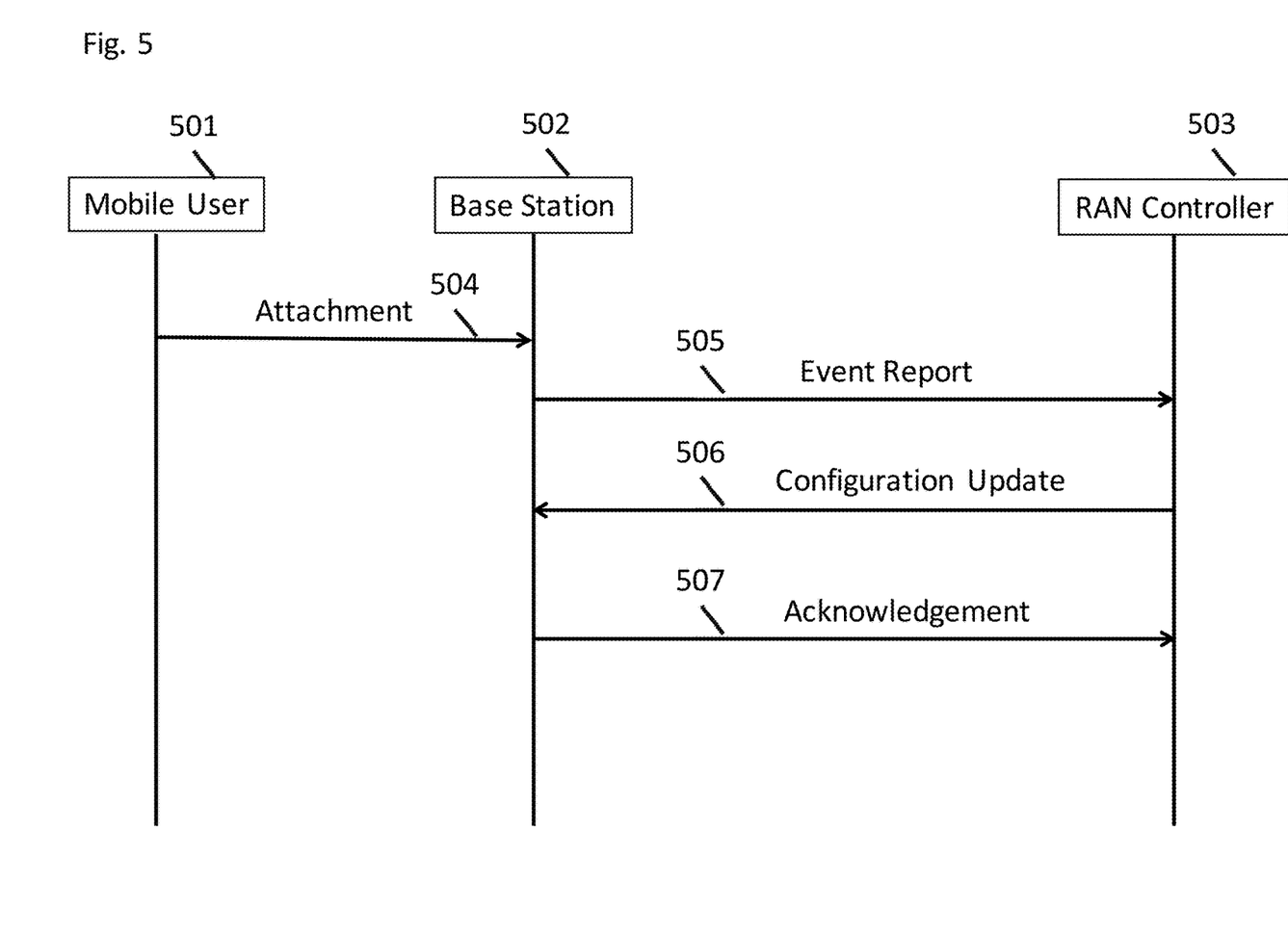
FIG. 5 illustrates an example control signaling flow between a base station and the RAN Controller upon attachment of a new Mobile User to this base station.

FIG. 5 shows an example control signaling flow between the communication agents of a base station (502) and the RAN Controller (503) when a mobile user (501) attaches to the base station (504). Upon attachment, the communication agent of the base station sends a time-stamped Event Report message (505) to the RAN Controller in which the attached Mobile Station's IMSI and/or Phone Number is included, along with its status. The status could be one of the following: idle, connected, detached. The base station sends this message as it does not yet know in which RAN slice to place this user. The RAN Controller responds by specifying the RAN Slice for the Mobile User. The response could reveal one of three options: The user may belong to a pre-programmed active slice, the user may belong to the pre-programmed default profile, or the user may belong to an active slice that is not yet programmed into the base station. If the user belongs to a pre-programmed slice, the configuration update will include the RAN slice identification along with the request to add the mobile user as a slice user as part of a profile configuration update command (506). If, on the other hand, the user belongs to a yet un-programmed RAN slice, the configuration update command (506) will include not only a request to add the mobile user as the new slice user, but also the name of the new RAN slice, and its complete profile information, which includes downlink and uplink scheduler names, admission control rules, handoff management parameters as well as the percentage of radio resources to be allocated for the slice. Once programming is complete, the base station sends an acknowledgement message (507). While this sequence of signaling is the preferred embodiment for how communication is conducted in the system upon a mobile user attachment to a base station, alternative sequences also exist. In another embodiment, the RAN Controller may acquire the information about the user attachment from the Core Network. In this case, message (505) becomes unnecessary. In another embodiment, the message (506) may be transmitted as a group of distinct messages rather than a single message.

Figure 6:
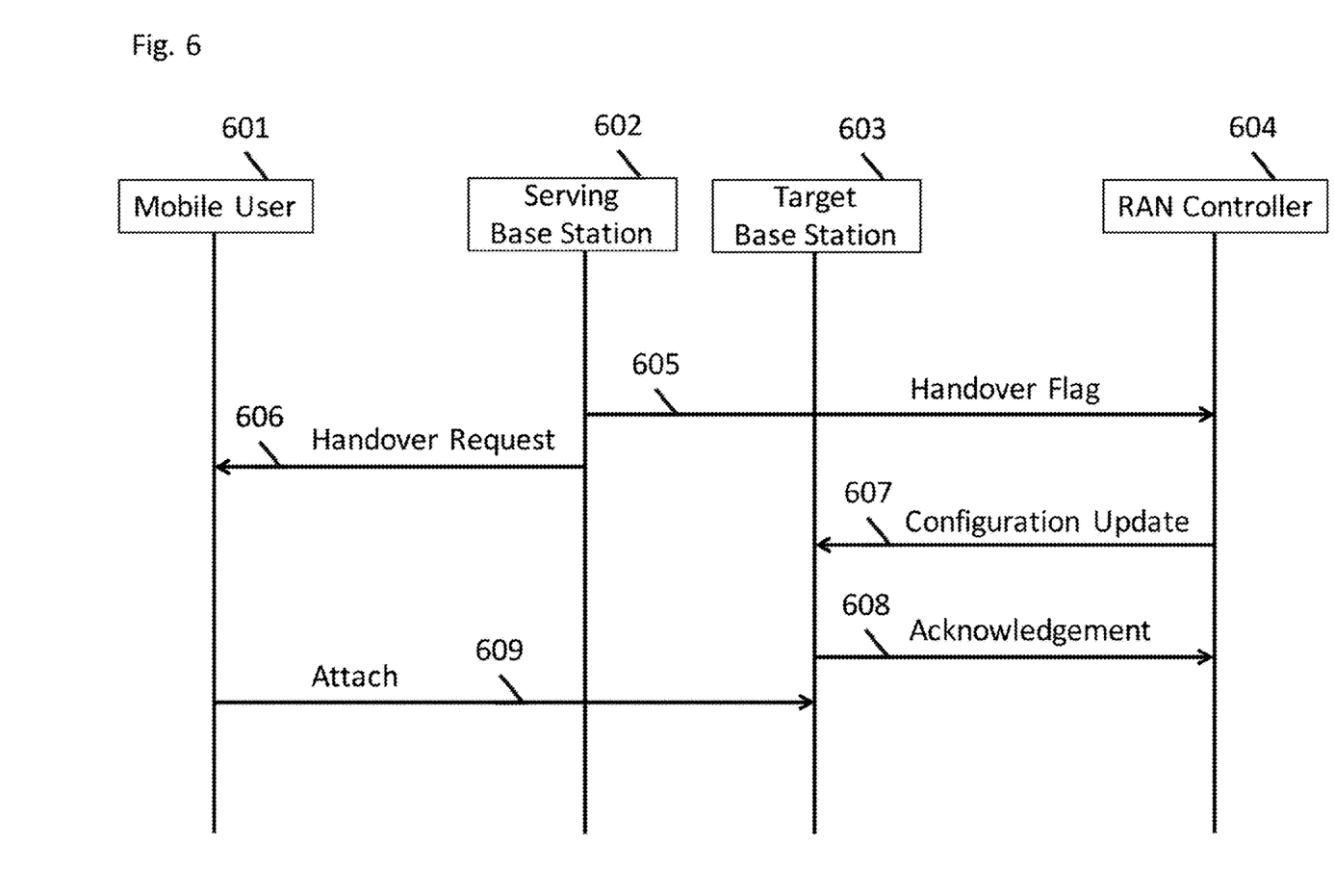
FIG. 6 shows an example control signaling flow between source and target base stations and the RAN Controller during the handover of a Mobile User.

FIG. 6 shows an example control signaling flow between the communication agents of a serving base station (602), a target base station (603) and the RAN Controller (604) when the serving base station (602) decides to initiate a handover for a mobile user (601) to the target base station (603). When the serving base station decides to initiate the handover, it contacts the mobile station in question to start the process (606). This process is to be conducted according to the wireless cellular standard that is in use. In the preferred embodiment, concurrently, or just before the start of the initiation, the communication agent of the serving base station sends a Handover Flag to the RAN Controller. This message includes the identities of the Mobile User that is going through a handover as well as the identity of the target base station. Upon receipt of this message, the RAN Controller needs to determine the active RAN Slice that this user will belong to in the target base station after the handover procedure is completed. There are three possibilities: The user may belong to a pre-programmed active slice in the target base station which may or may not be the same slice it is in the serving base station, the user may belong to the pre-programmed default profile, or the user may belong to an active slice that is not yet programmed into the base station in the target base station which may or may not be the same slice it is in the serving base station. The identity of the RAN Slice for this user is conveyed to the target base station in a configuration update message (607). If the user belongs to a pre-programmed slice in the target base station, the configuration update will include the RAN slice identification along with the request to add the mobile user as a slice user (607). If, on the other hand, the user belongs to a yet un-programmed RAN slice, the configuration update command (607) will include not only a request to add the mobile user as the new slice user, but also the name of the new RAN slice, and its complete profile information, which includes downlink and uplink scheduler names, admission control rules, handoff management parameters as well as the percentage of radio resources to be allocated for the slice. Once programming is complete, the target base station sends an acknowledgement message (608). It is desirable to complete this process prior to the completion of the handover procedure, which results in the attachment of the mobile user to the target base station (609). While this sequence of signaling is the preferred embodiment for how communication is conducted in the system upon the start of a handover process for a mobile user, alternative sequences also exist. In another embodiment, the RAN Controller may acquire the information about the start of a handover procedure from the Core Network. In this case, message (605) becomes unnecessary. In another embodiment, the message (607) may be transmitted as a group of distinct messages rather than a single message.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a system and method for communication between programmable base stations and software-defined radio access network controllers. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A method as implemented in a radio access network (RAN) controller during power up of a base station comprising:
   (a) receiving, from a base station, an Authentication Request message comprising an identity of the base station, the RAN controller;
   (b) authenticating the received identity of the base station against a database of registered base stations;
   (c) transmitting a result of the authentication in step (b) as an Acknowledgement message;
   (d) when the result of the authentication is valid, receiving, from the base station, a Report message comprising a time stamp and a status of the base station;
   (e) when the received status in step (d) indicates that the base station is active, transmitting, to the base station, a Configuration message comprising profile information for at least one RAN slice called default RAN slice to be activated in the base station, wherein the default RAN slice is programmed to serve all mobile users that are not part of any RAN slices pre-programmed in the base station before power up; and
   (f) receiving, from the base station, an Acknowledgement message upon successful programming of the default RAN slice.

2. The method of claim 1, wherein the Authentication Request message in step (a) further includes an IP address of the base station.

3. The method of claim 1, wherein the Authentication Request message in step (a) further includes GPS coordinates associated with the base station.

4. The method of claim 1, is implemented using a Communications Agent in a RAN controller and by using the same Communications Agent in the base station, the two Communications Agents interconnected with a dedicated control channel, the Communications Agent in the RAN controller programming RAN slices in those base stations with Communication Agents, each slice having a profile description; the Communications Agent further comprising the subsystems of:
   a layer 1-3 protocol stack to control and process incoming/outgoing control traffic between base station and RAN controller,
      (1) admission control module implementing an admissions control algorithm determining whether to admit a flow for the given profile,
      (2) handoff control module defining and implementing a handoff operation from the serving base station to the target base station for the given profile,
      (3) scheduling module defining and implementing a scheduling operation for the given profile, and
      (4) a radio resource mapping module mapping virtual resources from all active virtualized instances to one or more physical radio resources.

5. The method of claim 1, wherein active profiles in the RAN result in dynamic slicing of the RAN, where each RAN slice spans a given geography and a subset of the wireless resources within this geography.

* * * * *